(12) United States Patent
Hu

(10) Patent No.: US 11,222,207 B2
(45) Date of Patent: *Jan. 11, 2022

(54) INTELLIGENT SWEEPING ROBOT

(71) Applicant: BEIJING TAITAN TECHNOLOGY CO., LTD., Beijing (CN)

(72) Inventor: Guohui Hu, Shenzhen (CN)

(73) Assignee: BEIJING TAITAN TECHNOLOGY CO., LTD., Beijing (CN)

( * ) Notice: Subject to any disclaimer, the term of this patent is extended or adjusted under 35 U.S.C. 154(b) by 39 days.

This patent is subject to a terminal disclaimer.

(21) Appl. No.: 16/731,119

(22) Filed: Dec. 31, 2019

(65) Prior Publication Data

US 2020/0134314 A1  Apr. 30, 2020

(30) Foreign Application Priority Data

Dec. 30, 2019 (CN) .......................... 201911387092.2

(51) Int. Cl.
*G06K 9/00* (2006.01)
*G06T 7/73* (2017.01)
(Continued)

(52) U.S. Cl.
CPC .......... *G06K 9/00664* (2013.01); *A47L 11/24* (2013.01); *A47L 11/4002* (2013.01); *A47L 11/4011* (2013.01); *A47L 11/4061* (2013.01); *B25J 9/1666* (2013.01); *B25J 11/0085* (2013.01); *G05D 1/0238* (2013.01);
(Continued)

(58) Field of Classification Search
CPC .......... G06K 9/00805; G06K 9/00664; G06K 9/6277; G05D 1/0238; G05D 1/0219; G05D 1/0246; G05D 2201/0203; G06T 7/194; G06T 7/70; G06T 7/73; G06T 2207/30261; A47L 11/24; A47L 11/4061; A47L 11/4011; A47L 11/4002; A47L 2201/04; B25J 11/0085; B25J 9/1666
See application file for complete search history.

(56) References Cited

U.S. PATENT DOCUMENTS

| 2009/0190798 A1* | 7/2009 | Lee ...................... G06K 9/6292 |
| | | 382/103 |
| 2010/0070078 A1* | 3/2010 | Kong ....................... G06K 9/00 |
| | | 700/259 |

(Continued)

*Primary Examiner* — Brenda C Bernardi

(57) ABSTRACT

The present invention discloses an intelligent sweeping robot which is used for detecting whether a foreground object is an obstacle or not according to the extracted foreground object features; marking an area, located by the foreground object, as an obstacle point if a detection result is that the foreground object is the obstacle, and resetting a second sweeping path for avoiding the obstacle point; and further determining a first conditional probability of the foreground object being the obstacle according to the extracted scene features and foreground object features if the detection result is that whether the foreground object is the obstacle or not cannot be determined, determining the foreground object to be the obstacle if the first conditional probability is larger than a preset threshold value, marking the area, located by the foreground object, as the obstacle point, and resetting the second sweeping path for avoiding the obstacle point.

5 Claims, 1 Drawing Sheet

(51) Int. Cl.
    *G06T 7/194*     (2017.01)
    *G05D 1/02*     (2020.01)
    *B25J 9/16*     (2006.01)
    *A47L 11/24*     (2006.01)
    *A47L 11/40*     (2006.01)
    *B25J 11/00*     (2006.01)

(52) U.S. Cl.
    CPC ................ *G06T 7/194* (2017.01); *G06T 7/73* (2017.01); *A47L 2201/04* (2013.01)

(56) References Cited

U.S. PATENT DOCUMENTS

| | | | | |
|---|---|---|---|---|
| 2010/0228394 A1* | 9/2010 | Yi | ........................ | G05D 1/0246 |
| | | | | 700/253 |
| 2012/0051595 A1* | 3/2012 | Lee | ...................... | G05D 1/0246 |
| | | | | 382/103 |
| 2013/0116825 A1* | 5/2013 | Kim | ........................ | A47L 11/20 |
| | | | | 700/259 |
| 2013/0116826 A1* | 5/2013 | Kim | ..................... | G05D 1/0246 |
| | | | | 700/259 |
| 2017/0213100 A1* | 7/2017 | Yun | ........................ | G06T 7/174 |

* cited by examiner

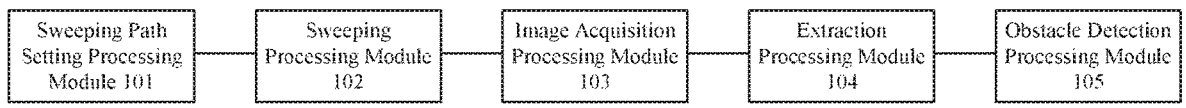
Fig. 1
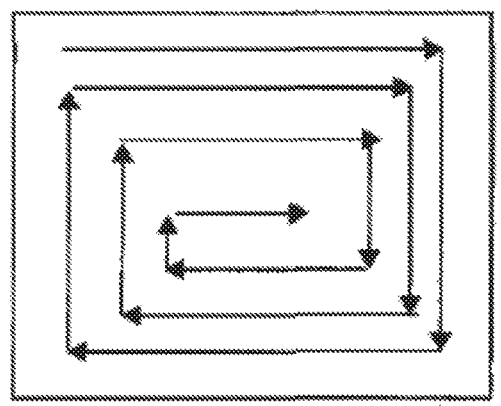
Fig. 2
| Name | Code |
|---|---|
| Free Grid Unit | 1 |
| Obstacle Grid Unit | 0 |
Fig. 3
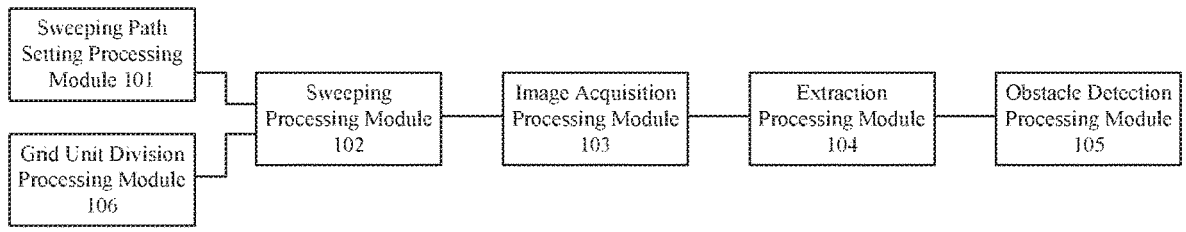
Fig. 4

INTELLIGENT SWEEPING ROBOT

TECHNICAL FIELD

The present invention relates to the technical field of intelligent robots, in particular to an intelligent sweeping robot.

BACKGROUND

With development of artificial intelligence, more and more intelligent terminals start to enter the life of people, for example, an intelligent sweeping robot capable of automatically finishing work of sweeping, dust collection, mopping and the like to a floor in a room and sucking sundries on the ground into a garbage storage box self to realize cleaning of the ground. While in the prior art, the intelligent sweeping robot generally acquires front image information through a front camera, detects whether an obstacle is present or not according to the acquired front image information and automatically avoids the obstacle if the obstacle is detected. However, obstacle detection in the prior art is to extract foreground object features from the acquired image, the foreground object is determined to be the obstacle if the extracted foreground features are matched with all pre-saved features of the obstacle, and whether the foreground object is the obstacle or not cannot be determined if the extracted foreground object features are only partial features of the obstacle, but when the intelligent sweeping robot actually runs, the acquired image may be fuzzy due to the problems of aging, parameter setting or the like of the camera equipment, only a part of the foreground object features can be acquired through the fuzzy image, and the acquired image cannot be matched with the pre-saved obstacle through a part of the foreground object features, namely, the obstacle cannot be detected, so that the intelligent sweeping robot cannot timely change the sweeping path.

SUMMARY

The technical problem to be solved by the present invention is to provide an intelligent sweeping robot with more comprehensiveness in detection of the obstacle; and the intelligent sweeping robot can be convenient in changing the sweeping path in time.

In order to solve the technical problems mentioned above, the present invention adopts the following technical scheme:

an intelligent sweeping robot, comprising:

a sweeping path setting processing module, used for setting a first sweeping path for walking of the intelligent sweeping robot according to a target area, swept by the intelligent sweeping robot;

a sweeping processing module, used for controlling the intelligent sweeping robot to perform sweeping according to the first sweeping path;

an image acquisition processing module, used for acquiring an image in front of the intelligent sweeping robot during walking;

an extraction processing module, used for extracting foreground object features and scene features from the acquired image; and an obstacle detection processing module, used for detecting whether a foreground object is an obstacle or not according to the extracted foreground object features; if a detection result is that the foreground object is the obstacle, marking an area, located by the foreground object, as an obstacle point, and resetting a second sweeping path for avoiding the obstacle point; and further determining a first conditional probability of the foreground object being the obstacle according to the extracted scene features and foreground object features if the detection result is that whether the foreground object is the obstacle or not cannot be determined, determining the foreground object to be the obstacle if the first conditional probability is larger than a preset threshold value, marking the area, located by the foreground object, as the obstacle point, and resetting the second sweeping path for avoiding the obstacle point.

Compared with the prior art, the intelligent sweeping robot has the beneficial effects that:

by adopting the intelligent sweeping robot provided by the present invention, the foreground object features and the scene features are extracted from the acquired image; whether the foreground object is the obstacle or not is detected according to the extracted foreground object features; the area, located by the foreground object, is marked as the obstacle point if the detection result is that the foreground object is the obstacle, and a second sweeping path for avoiding the obstacle point is reset; and if the detection result is that whether the foreground object is the obstacle or not cannot be determined, for example, if the acquired image is fuzzy, when a part of the foreground object features can be acquired through the fuzzy image only, and the foreground object cannot be determined whether as the obstacle or not, the first conditional probability of the foreground object being the obstacle is further determined according to the extracted scene features and foreground object features, the foreground object is determined to be the obstacle if the first conditional probability is larger than the preset threshold value, the area, located by the foreground object, is marked as the obstacle point, and the second sweeping path for avoiding the obstacle point is reset. For the intelligent sweeping robot provided by the present invention, by combining the scene features with the foreground object features, the obstacle is detected based on the conditional probability principle and is more comprehensively detected, and the situation that the intelligent sweeping robot timely changes the sweeping path is facilitated.

BRIEF DESCRIPTION OF THE DRAWINGS

FIG. 1 is a block diagram of a first embodiment of an intelligent sweeping robot according to the present invention;

FIG. 2 is a schematic diagram of one embodiment of setting a sweeping path in the intelligent sweeping robot according to the present invention;

FIG. 3 is a schematic diagram of one embodiment of coding a grid unit in the intelligent sweeping robot according to the present invention; and FIG. 4 is a block diagram of a second embodiment of the intelligent sweeping robot according to the present invention.

DESCRIPTION OF THE ILLUSTRATIVE EXAMPLES

Referring to FIG. 1, FIG. 1 is the block diagram of one embodiment of the intelligent sweeping robot according to the present invention, and the intelligent sweeping robot of the embodiment mainly comprises the following modules:

a sweeping path setting processing module 101, a sweeping processing module 102, an image acquisition processing module 103, an extraction processing module 104 and an obstacle detection processing module 105; and detailed description is as follows:

for the sweeping path setting processing module 101, in the embodiment, the sweeping path setting processing module 101 is mainly used for setting a first sweeping path for walking of the intelligent sweeping robot according to a target area, swept by the intelligent sweeping robot; in actual implementation, path setting is full-coverage path setting in the target area with capability of adopting various algorithms to set the sweeping path, for example, adopting a random covering method, a Dijkstra algorithm, a neural network algorithm and the like; while referring to FIG. 2, FIG. 2 is a schematic diagram of one embodiment of a sweeping path set by adopting the random covering method, the sweeping path can also be set by adopting other manners, which is not specifically defined here.

For the sweeping processing module 102, the sweeping processing module 102 in the embodiment is mainly used for controlling the intelligent sweeping robot to perform sweeping according to the first sweeping path; and in actual implementation, with the sweeping path set in FIG. 2 as an example, that the intelligent sweeping robot unidirectionally drives to a turn is one sweeping process, and four sweeping processes are needed for a circle of sweeping, the description of which is not repeated here.

For the image acquisition processing module 103, the image acquisition processing module 103 in the embodiment is mainly used for acquiring an image in front of the intelligent sweeping robot during walking; and in actual implementation, an image acquisition device needs to be arranged in the front of a body of the intelligent sweeping robot, can be a vidicon, a camera and the like and in addition, is capable of acquiring the image in front of the intelligent sweeping robot in real time and also determining a large object to be a to-be-detected object when the intelligent sweeping robot sweeps the large object, which is not specifically defined here.

For the extraction processing module 104, the extraction processing module 104 in the embodiment is mainly used for extracting foreground object features and scene features from the acquired image; in actual implementation, feature extraction from the acquired image can adopt various manners, for example, for extraction of the foreground object features, the image can be divided into a foreground portion and a background portion by converting the image to a binary image, the binary image is superimposed on the original image to obtain a foreground image, then the foreground object features can be extracted according to the foreground image, and an extraction manner of the foreground object features is not specifically defined here; and furthermore, the scene features can be also extracted with the above manner, the description of which is not repeated here.

For the obstacle detection processing module 105, the obstacle detection processing module 105 in the embodiment is mainly used for determining whether the foreground object is an obstacle or not according to the foreground object features; and in actual implementation, a feature point matching manner can be adopted for detecting whether the foreground object is the obstacle or not according to the foreground object features, namely, obstacle features are predefined, matching is performed on the determined foreground object features and the obstacle features, and the foreground object is determined to be the obstacle if the determined foreground object features are matched with the obstacle features and not to be the obstacle if the determined foreground object features are not matched with the obstacle features.

Moreover, if the acquired image is clear, when the obstacle detection processing module 105 of the embodiment detects that the foreground object is the obstacle, an area, located by the foreground object, is marked as an obstacle point, a second sweeping path for avoiding the obstacle point is reset, and sweeping is continuously performed according to the first sweeping path if the detection result is that the foreground object is not the obstacle.

Moreover, for example, if the acquired image is fuzzy, the extracted foreground object features are a part of the whole features, whether the foreground object is the obstacle or not cannot be determined according to the extracted foreground object features; therefore, when the detection result of the obstacle detection processing module 105 of the embodiment is that whether the foreground object is the obstacle or not cannot be determined, a first conditional probability of the foreground object being the obstacle is determined according to the extracted scene features and foreground object features; if the first conditional probability is lager than a preset threshold value, the foreground object is determined as the obstacle, and the area, located by the foreground object, is marked as the obstacle point, and the second sweeping path for avoiding the obstacle point is reset; and if the first conditional probability is smaller than a preset threshold value, the foreground object is determined not to be the obstacle, and sweeping is continuously performed according to the first sweeping path.

A manner of detecting the obstacle according to the conditional probability of the present invention is explained in detail blow. According to the present invention, the principle of detecting the obstacle based on the conditional probability is to perform detection by taking the scene features and the foreground object features as detection constraint conditions, particularly, the obstacle detection processing module 105 in the embodiment further determines the first conditional probability of the foreground scene being the obstacle according to the extracted scene features and foreground object features, and the following mode is concretely adopted, that is:

various scene features and various foreground object features are combined into various conditions in advance, and the conditional possibilities of the foreground object being the obstacle under various conditions are determined and saved;

the corresponding condition is determined according to the extracted scene features and foreground object features; and Pre-saved conditional probability information is inquired according to the determined condition to obtain a first conditional probability, corresponding to the condition.

Description is made with a simple example below, for example, assuming in an environment, located by the intelligent sweeping robot, there are two kinds of scene features, as A1 and A2 respectively, and also two kinds of foreground object features, as B1 and B2 respectively, 4 conditions, i.e. A1B1, A1B2, A2B1 and A2B2, are obtained by combining the scene features with the foreground object features, a threshold value is set to be 80%, and the probability of the foreground object being the obstacle is predefined as 40% under the A1B1 condition, as 90% under the A1B2 condition, as 75% under the A2B1 condition and as 60% under the A2B2 condition by training and testing a sample; in the prior art, the foreground object can be determined as the obstacle only under the condition of totally matching with the two foreground object features B1 and B2, and whether the foreground object is the obstacle or not cannot be determined or the foreground object is directly determined not to be the obstacle as for the condition of extracting the foreground object feature B2 only; while, according to the present invention, by combining the extracted foreground object feature B2 with the extracted scene feature A1, the corresponding condition is determined as A1B2, the conditional probability information, saved in advance, is further inquired to determine that the conditional probability of the foreground object, under the corresponding condition of A1B2, being the obstacle is 90%, and the foreground object can be determined as the obstacle as the conditional probability is larger than the preset threshold value of 80%. According to the present invention, by combining the scene features with the foreground object features as the detection constraint conditions, detection on the obstacle is more comprehensive, and the situation that the intelligent sweeping robot timely changes the sweeping path is facilitated.

Note that as another preferred embodiment, the extraction processing module 104 of the present invention further extracts reference object features from the acquired image;

if that whether the foreground object is the obstacle or not cannot be determined is determined as the detection result, the obstacle detection processing module 105 further determines a second conditional probability of the foreground object being the obstacle according to the extracted scene features, the reference object features and the foreground object characteristics; if the second conditional probability is larger than the preset threshold value, the foreground object is determined as the obstacle, the area, located by the foreground object, is marked as an obstacle point, and a third sweeping path for avoiding the obstacle point is reset.

Note that the step that the obstacle detection processing module 105 further determines a second conditional probability of the foreground object being the obstacle according to the extracted scene features, reference object features, and foreground object features can also adopt the following manner, namely, various scene features are combined with the reference object features and various foreground object features to form various conditions in advance, and the conditional probabilities of the foreground object being the obstacle under various conditions are determined and saved;

the corresponding condition is determined according to the extracted scene features, reference object features and foreground object features; and pre-saved conditional probability information is inquired according to the determined condition to obtain a second conditional probability, corresponding to the condition.

Moreover, to improve the working efficiency of the intelligent sweeping robot, as a preferred embodiment, referring to FIG. 4, the intelligent sweeping robot of the present invention further comprises a grid unit division processing module 106, which of the embodiment is mainly used for dividing the target area, swept by the intelligent sweeping robot, into various grid units, wherein the grid units are divided into free grid units and obstacle grid units, each free grid unit is an area for free passing, and each obstacle grid unit is an area with an obstacle point; and referring to FIG. 3, according to the embodiment of the present invention, the grid units can be coded, the free grid units are coded to be 1, the obstacle grid units are coded to be 0, and the intelligent sweeping robot can quickly identify the grid units through codes so as to reduce the sweeping time. Note that according to the embodiment, the sweeping processing module 102 controls the intelligent sweeping robot to perform sweeping according to a quick sweeping mode in the free grid units and perform sweeping according to a fine sweeping mode in the obstacle grid units, and therefore, on one hand, the working efficiency of the intelligent sweeping robot can be ensured by adopting the quick sweeping mode in the free grid units, and on the other hand, more various garbage generally exists at the obstacle, so that sweeping can be cleaner by adopting the fine sweeping mode at the obstacle grid units.

Moreover, according to the present invention, after sweeping is finished, grid unit coding information of the target area is saved, a sweeping environment map is updated according to the saved grid unit coding information of multiple sweeping, the sweeping path is set according to the updated environment map during next sweeping, and the description is not repeated here.

The invention claimed is:

1. An intelligent sweeping robot, characterized by comprising:

an intelligent sweeping robot which is equipped with a sweeping path setting processing module, a sweeping processing module, an image acquisition processing module, an extraction processing module and an obstacle detection processing module, and the sweeping path setting processing module, used for setting a first sweeping path for walking of the intelligent sweeping robot according to a target area, swept by the intelligent sweeping robot;

the sweeping processing module, used for controlling the intelligent sweeping robot to perform sweeping according to the first sweeping path;

the image acquisition processing module, used for acquiring an image in front of the intelligent sweeping robot during walking;

the extraction processing module, used for extracting foreground object features and scene features from the acquired image; and the obstacle detection processing module, used for detecting whether a foreground object is an obstacle or not according to the extracted foreground object features; if a detection result is that the foreground object is the obstacle, marking an area, located by the foreground object, as an obstacle point, and resetting a second sweeping path for avoiding the obstacle point; and determining a first conditional probability of the foreground object being the obstacle according to the extracted scene features and foreground object features if the detection result is that whether the foreground object is the obstacle or not cannot be determined, determining the foreground object to be the obstacle if the first conditional probability is larger than a preset threshold value, marking the area, located by the foreground object, as the obstacle point, and resetting the second sweeping path for avoiding the obstacle point.

2. The intelligent sweeping robot according to claim 1, characterized in that the following manner for determining the first conditional probability of the foreground object being the obstacle by the obstacle detection processing module according to the extracted scene features and foreground object features is concretely as follows:

various scene features and various foreground object features are combined into various conditions in advance, and the conditional probabilities that the foreground object is the obstacle under various conditions are determined and saved;

a corresponding condition is determined according to the extracted scene features and foreground object features; and conditional probability information, saved in advance, is inquired according to the determined condition to obtain the first conditional probability, corresponding to the condition.

3. The intelligent sweeping robot according to claim 1, characterized in that the extraction processing module further extracts reference object features from the acquired image; and a second conditional probability of the foreground object being the obstacle is determined according to the extracted scene features, reference object features and foreground object features if the obstacle detection processing module determines the detection result to be that whether the foreground object is the obstacle or not cannot be determined, and if the second conditional probability is larger than a preset threshold value, the foreground object is determined as the obstacle, the area, located by the foreground object, is marked as the obstacle point, and a third sweeping path for avoiding the obstacle point is reset.

4. The intelligent sweeping robot according to claim 1, characterized by further comprising a grid unit division processing module which is equipped in the intelligent sweeping robot, the grid unit division processing module is used for dividing the target area, swept by the intelligent sweeping robot, into various grid units, wherein the grid units are divided into free grid units and obstacle grid units, each free grid unit is an area for free passing, and each obstacle grid unit is an area with the obstacle point.

5. The intelligent sweeping robot according to claim 4, characterized in that the sweeping processing module controls the intelligent sweeping robot to perform sweeping according to a quick sweeping mode in each free grid unit and perform sweeping according to a fine sweeping mode in each obstacle grid unit.

* * * * *